US008901843B2

(12) United States Patent
Jin et al.

(10) Patent No.: US 8,901,843 B2
(45) Date of Patent: Dec. 2, 2014

(54) LIGHT DRIVING APPARATUS AND METHOD THEREOF

(71) Applicant: Dongwoon Anatech Co., Ltd., Seoul (KR)

(72) Inventors: Jung Ho Jin, Gyeonggi-Do (KR); Hyun Il Park, Seoul (KR); Ju Seong Kim, Seoul (KR)

(73) Assignee: Dongwoon Anatech Co., Ltd., Seoul (KR)

( * ) Notice: Subject to any disclaimer, the term of this patent is extended or adjusted under 35 U.S.C. 154(b) by 0 days.

(21) Appl. No.: 13/847,907

(22) Filed: Mar. 20, 2013

(65) Prior Publication Data

US 2013/0249427 A1    Sep. 26, 2013

(30) Foreign Application Priority Data

Mar. 21, 2012  (KR) .................. 10-2012-0028720

(51) Int. Cl.
H05B 33/08    (2006.01)

(52) U.S. Cl.
CPC ........... H05B 33/0815 (2013.01); *Y02B 20/347* (2013.01)
USPC ........... 315/279; 315/205; 315/219; 315/291; 315/308

(58) Field of Classification Search
CPC ............... H05B 33/08; H05B 33/0815; H05B 33/0818; H05B 33/0887; H05B 37/02
USPC ...... 315/200 R, 205, 206, 219, 279, 291, 308
See application file for complete search history.

(56) References Cited

U.S. PATENT DOCUMENTS

| 2006/0077697 | A1* | 4/2006 | Yang .......................... 363/21.13 |
| 2006/0133117 | A1* | 6/2006 | genannt Berghegger ....... 363/19 |
| 2012/0169245 | A1* | 7/2012 | Chen ............................ 315/223 |
| 2013/0057173 | A1* | 3/2013 | Yao et al. ...................... 315/206 |

FOREIGN PATENT DOCUMENTS

KR    1020110136537    12/2011

* cited by examiner

*Primary Examiner* — Douglas W Owens
*Assistant Examiner* — Thai Pham
(74) *Attorney, Agent, or Firm* — Ohlandt Greeley Ruggiero & Perle LLP

(57) ABSTRACT

A light driving apparatus includes a first rectifying unit for receiving AC power and rectifying the AC power into DC, a switching element controlled to turn on or off by a control signal, a transforming unit having a transformer and an inductor connected to a primary side of the transformer in parallel, a second rectifying unit for rectifying a secondary side output of the transforming unit and supplying an output voltage thereof to a LED unit, and a control unit provided in the primary side to give a constant-current control function so that a secondary side output is maintained consistently. According to the present disclosure, it is possible to simplify the circuit structure of the secondary side and improve the efficiency by controlling the secondary side current at the primary side without secondary side feedback information.

8 Claims, 4 Drawing Sheets

LIGHT DRIVING APPARATUS AND METHOD THEREOF

CROSS-REFERENCE TO RELATED APPLICATION

This application claims priority to Korean Patent Application No. 10-2012-0028720, filed on Mar. 21, 2012, and all the benefits accruing therefrom under 35 U.S.C. §119, the contents of which in its entirety are herein incorporated by reference.

BACKGROUND

1. Field

The present disclosure relates to a light driving apparatus and a method thereof, and more particularly, to a light driving apparatus and a method thereof adopting a Primary Side Regulation (PSR) manner which allows an Light Emitting Diode (LED) to operate effectively.

2. Description of the Related Art

As the LED technology has recently developed in various aspects such as light emission efficiency, high brightness, environment-friendly, low power consumption, and miniaturization, LED lights are spotlighted in the light source field.

In an LED light, a power source characteristic is one of main factors which determine the overall performance. The optical power of an LED varies according to the change of a power source, and so the stability of the power source is very important in order to maintain the optical power consistently. In addition, due to the nature of the LED light which should be controlled consistently, a constant current control method is preferred in the driving circuit of the LED light.

A general LED driving circuit according to the prior art uses a fly-back converter.

The fly-back converter is a known technique for detecting an error of an output voltage by providing an error sensing circuit to a secondary side output terminal, and feeding back the detected error value to a power converting circuit at a primary side through an opto coupler provided at the secondary side in order to stabilize the output voltage.

The fly-back converter demands a complicated circuit structure in order to protect against overvoltage during the constant-current control and the feedback open operation. In particular, since the secondary side needs a control circuit for constant current and constant voltage and many peripheral elements (including passive elements) such as an expensive opto coupler, the circuit structure for driving the LED light is complicated along with drawbacks such as high cost and difficult miniaturization.

FIG. 1 shows a Primary Side Regulation (PSR) driving circuit which simplifies the circuit design by reducing the number of parts of the secondary side to solve the above drawbacks.

The light driving apparatus of FIG. 1 is classified into a primary side and a secondary side based on a transforming circuit 30. The primary side includes circuit elements such as an AC power source 10, a rectifying circuit 20, a switching element 40, a control circuit 60, and an inductor 50, and the secondary side includes a LED unit 70, and a diode D1 and a capacitor C2 for rectifying and smoothing the voltage of the secondary side.

In the primary side regulation method as shown in FIG. 1, the primary side implements the constant-current control by using the feedback information of the secondary side, and accordingly many circuit elements of the secondary side may be removed (excluded). Therefore, the circuit structure may be simplified in comparison to the fly-back converter.

The rectifying circuit 20 rectifies AC power $V_{ac}$ output from the AC power source 10 into DC. The transforming circuit 30 transforms the magnitude of the primary side voltage output from the rectifying circuit 20 and outputs it to the secondary side. The secondary side output is rectified by a diode D1, charged in a capacitor C2, and then supplied in the form of DC power $V_{OUT}$ to the LED unit 70 which is a load.

The inductor 50 of the primary side is an auxiliary coil for the feedback of the secondary side current.

The control circuit 60 resistance-distributes voltage $V_{dd}$, which is drawn from the inductor 50 and charged in the capacitor C3 through the diode D2, to compare it with a reference voltage, and controls the switching element 40 accordingly to the comparison result to increase or decrease the amount of energy output to the LED unit 70, so that the voltage charged in the capacitor C2 of the output terminal is maintained consistently.

The control circuit 60 detects current $I_d$ flowing at the secondary coil of the transforming circuit 30 through the inductor 50 which is an auxiliary coil and uses the current for the constant-current control.

As described above, if the auxiliary coil of the primary side detects a value of the secondary side current and uses the value as secondary side feedback information for the constant-current control, an error or mistake may occur during a current detecting process. Therefore, the constant-current control function may not be easily implemented precisely.

In addition, the value of the secondary side current used as the feedback information by the control circuit 60 of the aforementioned primary side regulation type corresponds to a peak current. In case of the fly-back converter, the peak current is also generally used to implement constant current and constant voltage. However, since the peak current is a dynamic value which changes instantly, the use of a peak current deteriorates stability which is one of most important factors for LED operation even though the driving speed increases.

RELATED LITERATURES

Patent Literature
(Patent Literature 1) Korean Unexamined Patent Publication No. 10-2011-0136537

SUMMARY

The present disclosure is directed to providing a light driving apparatus and method which may simplify the circuit structure and reduce costs by implementing a constant-voltage/constant-current control which does not need a control circuit, an opto coupler and peripheral elements at a secondary side.

The present disclosure is also directed to providing a light driving apparatus and method which allows a secondary side current to be controlled at a primary side without secondary side feedback information and therefore allows the improvement of efficiency.

The present disclosure is also directed to providing a light driving apparatus and method which may implement more stable and precise constant-current control in comparison to the case where a peak current is used as secondary side feedback information.

The technical subject of the present disclosure is not limited to the above, and other technical subjects not mentioned will be clearly understood from the following description by those having ordinary skill in the art.

In one aspect, there is provided a light driving apparatus, which includes: a first rectifying unit for receiving AC power and rectifying the AC power into DC; a switching element; a transforming unit having a transformer for transforming the magnitude of an input voltage output from the first rectifying unit and an inductor connected to a primary side of the transformer in parallel, the transforming unit storing energy in the inductor when the switching element turns on and transferring the energy stored in the inductor to a secondary side when the switching element turns off; a second rectifying unit for rectifying a secondary side output of the transforming unit and supplying an output voltage thereof to a LED unit; and a control unit for calculating a secondary side average current based on current and voltage of the primary side, obtained from the inductor included in the primary side of the transforming unit, and controlling the switching element to turn on or off according to the calculation result so that a constant driving current flows at the LED unit.

The control unit may include: an operator unit for obtaining a primary side average current of a switching turn-on period from the primary side of the transforming unit, receiving voltages at both ends of the inductor, and calculating a secondary side average current based on the obtained primary side average current and the voltages at both ends of the inductor; and a switching control unit for converting the secondary side average current output from the operator unit into voltage to be compared with a target voltage, and determining a logic value of a control signal output to the switching element according to the comparison result to control the switching element to turn on or off.

The operator unit may include: a first sampler for sampling an input voltage applied to one end of the inductor; a subtractor for receiving the input voltage at one end of the inductor and voltage applied to the other end of the inductor and performing a subtracting operation between both voltages; a second sampler for sampling a difference value output from the subtractor; a divider for dividing the input voltage sampled at the first sampler by the difference value sampled at the second sampler; a sensing resistor coupled between the switching element and the ground to detect a peak current of the switching turn-on period; a RC filter for averaging the output of the sensing resistor to obtain the primary side average current; and a multiplier for multiplying the primary side average current obtained by the RC filter and the output of the divider.

The operator unit may further include a delay timer for outputting a delay signal, so that the second sampler performs sampling as being synchronized with the delay signal of the delay timer.

The switching control unit may include: a compensator for outputting a difference between an average voltage obtained from the output of the multiplier and a target voltage; and a comparator for comparing the output of the compensator with a triangular pulse voltage which is a reference and outputting a control signal for controlling the switching element to turn on or off.

The switching control unit may further include a pulse generator for generating a pulse signal for synchronization control, inputting the pulse signal to the first sampler, generating a triangular pulse voltage which is a reference for error detection, and inputting the triangular pulse voltage to the comparator.

The control unit may calculate a secondary side average current I'$_S$ by using the equation below:

$$I'_S = \frac{A_{ON}}{T} \times \frac{V_{IN}}{V_{DS} - V_{IN}} \times \frac{1}{n}$$

Here, $A_{ON}$ represents a primary side current flowing at the inductor in a switching turn-on period, T represents a unit time, $A_{ON}/T$ represents a primary side average current of the switching turn-on period, $V_{IN}$ represents an input voltage applied to one end of the inductor, $V_{DS}$ represents voltage applied to the other end of the inductor, and 1/n represents a turns ratio.

In another aspect, there is also provided a light driving method, which includes: driving a transforming unit by controlling a switching element to turn on or off to store energy in an inductor included in a primary side of the transforming unit, and transferring the energy to a secondary side of the transforming unit; calculating a secondary side average current based on the primary side average current of a switching turn-on period obtained from the primary side of the transforming unit and voltages at both ends of the inductor; converting the calculated secondary side average current into voltage and comparing the voltage with a target voltage; and controlling the switching element to turn on or off again according to the comparison result so that a constant current flows at an LED unit located at the secondary side of the transforming unit.

The calculating of a secondary side average current may include: obtaining an input voltage applied to one end of the inductor and a difference value between the voltages at both ends of the inductor by means of sampling; dividing the sampled input voltage by the sampled difference value; obtaining a primary side average current by averaging a primary side output of the switching turn-on period; and obtaining a secondary side average current by multiplying the obtained primary side average current and the output of the dividing operation.

According to the light driving apparatus and method of the present disclosure, since the secondary side implements constant-voltage/constant-current control which does not need a control circuit, an opto coupler and peripheral elements, it is possible to simplify the circuit structure and reduce costs.

In addition, the primary side may control secondary side current without secondary side feedback information, and accordingly the efficiently may be improved.

In addition, in comparison to the case where a peak current is utilized as secondary side feedback information, the present disclosure may implement more stable and precise constant-current control.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

| | |
|---|---|
| 110: AC power source | 120: input terminal rectifying unit |
| 130: transforming unit | Q1: switching element |
| 200: control unit | 210: operator unit |
| 211,213: sampler | 212: subtractor |
| 214: divider | 215: sensing resistor |
| 216: RC filter | 217: multiplier |
| 218: delay timer | 220: switching control unit |
| 221: compensator | 222: comparator |
| 223: pulse generator | 310: output terminal rectifying unit |
| 320: LED unit | |

DETAILED DESCRIPTION OF THE PREFERRED EMBODIMENT

A conventional fly-back converter or a primary side regulation control method use a peak current in order to implement constant current. If a load has a dynamic characteristic like a cell phone charger, a rapid driving speed is required, and the peak current control method is effective for the rapid driving.

However, in the present disclosure, a light, particularly a LED light, is used as a load. Since such kind of load operates relatively statically, stable driving is much more important than rapid driving in order to obtain a constant optical output.

Accordingly, the present disclosure adopts the average current control advantageous in stability, instead of the peak current control advantageous in rapid driving. In addition, different from the conventional primary side regulation control method using a peak current, the present disclosure implements primary side regulation, which does not need secondary side feedback information, and thus ensures more precise and stable constant current output.

Hereinafter, a light driving apparatus and method according to an exemplarily embodiment of the present disclosure will be described in detail with reference to the accompanying drawings.

Figure 2:
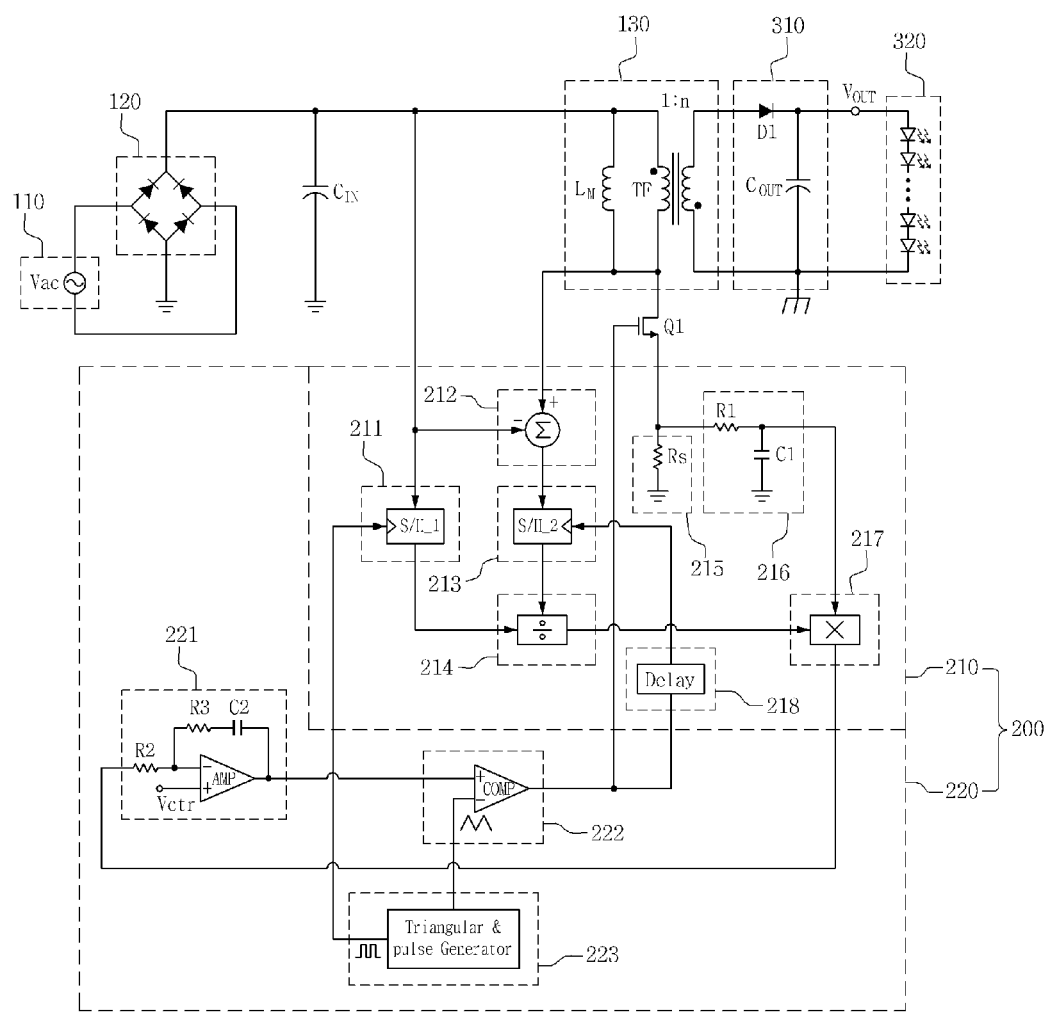
FIG. 2 is a diagram showing a light driving apparatus according to an embodiment of the present disclosure.
Figure 3A:
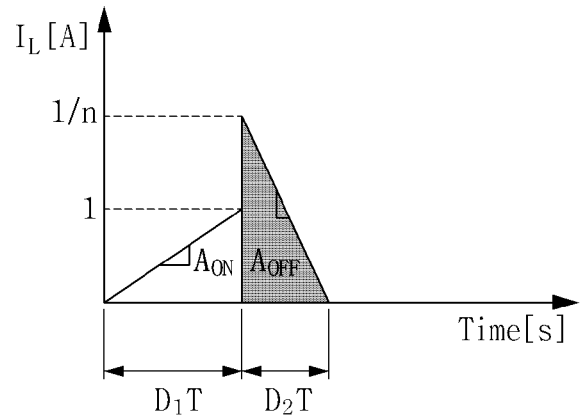
FIG. 3A~FIG. 3C are graphs for illustrating the principle of the primary side regulation manner adopted in the present disclosure.
Figure 3B:
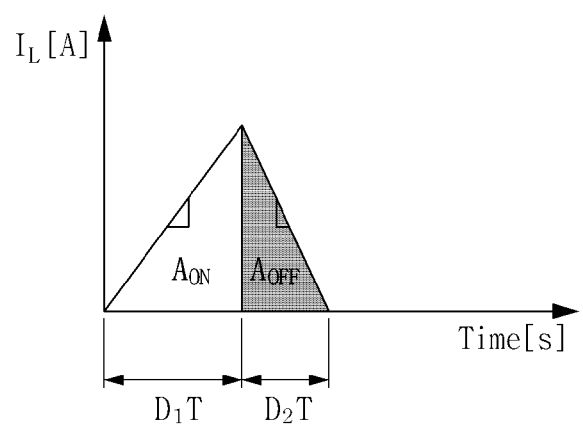
Figure 3C:
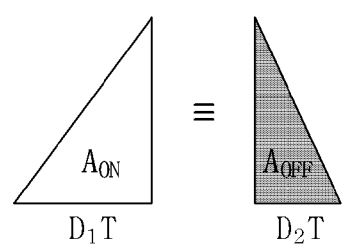

FIG. 2 is a diagram showing a light driving apparatus according to an embodiment of the present disclosure, and FIG. 3A~FIG. 3C are graphs for illustrating the principle of the primary side regulation manner adopted in the present disclosure.

Basically, since the present disclosure is directed to a primary side regulation type constant-current control, a primary side is a subject to control a secondary side current, and an object to be controlled is the secondary side current.

Accordingly, the present disclosure proposes a transforming unit 130 serving as a reference for classifying the primary side and the secondary side, an inductor $L_M$ included in the primary side of the transforming unit 130, and a circuit for deriving an equation for secondary side current based on the relation between a primary side current and a secondary side current, which can be known from the operation of a switching element Q1, and then controlling the secondary side current into a constant output based on the derived equation. It is assumed that a transformer TF in the transforming unit 130 has a turns ratio of 1:n (n<1).

First, a process of deriving an equation for secondary side current and its principle will be described below in detail.

Referring to FIG. 2, when the switching element Q1 is in a turn-on state, energy is charged to the inductor $L_M$ as current flows at the primary side of the transforming unit 130, and when the switching element Q1 is in a turn-off state, the energy charged to the inductor $L_M$ is transferred to the secondary side.

The energy stored in the primary side while the switching element Q1 is in turn-on operation may be considered as charge (increase) of inductor current $I_L$ according to time. In addition, the energy transferred to the secondary side during the switching turn-off period may be considered as decrease of inductor current $I_L$ according to time.

This concept may be expressed as a graph, as shown in FIG. 3A.

FIG. 3A exemplifies the change of current $I_L$ according to time at the inductor $L_M$ of the primary side.

The switching turn-on period $D_1T$ of FIG. 3A represents time during which energy is stored in the inductor $L_M$ as current flows at the primary side, and during this period, the switching element Q1 is operated to turn on and energy is stored in the inductor $L_M$ as the current flowing at the inductor $L_M$ gradually increases.

The switching turn-off period $D_2T$ represents time during which the energy stored during the switching turn-on period $D_1T$ is transferred to the secondary side, and in this period, the switching element Q1 is operated to turn off and the energy as much as previously stored is transferred to the secondary side as the current flowing at the inductor $L_M$ gradually decreases.

FIG. 3B exemplifies a ratio of a switching turn-on area $A_{ON}$ and a switching turn-off area $A_{OFF}$, in a case where the transforming unit 130 has a turns ratio of 1:1 (n=1).

In the graphs of FIGS. 3A and 3B, the switching turn-on area $A_{ON}$ represents a current capacity flowing into the inductor $L_M$ during the switching turn-on period $D_1T$. The switching turn-off area $A_{OFF}$ represents a current capacity discharging from the inductor $L_M$ during the switching turn-off period $D_2T$.

The switching turn-on area $A_{ON}$ and switching turn-off area $A_{OFF}$ are proportional to each other as shown in FIG. 3C. A relation between both areas $A_{ON}$, $A_{OFF}$ may be expressed by Equation 1 below.

$$A_{ON}:A_{OFF} = D_1T:D_2T \cdot \frac{1}{n} \qquad \text{Equation 1}$$

Here, $A_{ON}$ represents a switching turn-on area, and $A_{OFF}$ represents a switching turn-off area. $D_1T$ represents a switching turn-on period, and $D_2T$ represents a switching turn-off period. 1/n represents a turns ratio.

As described above, the ratio of the switching turn-on area $A_{ON}$ and the switching turn-off area $A_{OFF}$ has a proportional relationship, and if the value of the turns ratio, 1/n, increases, the height of the switching turn-off area $A_{OFF}$ will increase in proportion thereto.

Since the transforming unit 130 transfers the current capacity to the secondary side according to the turns ratio as much as an amount accumulated in and then discharged from the inductor $L_M$ of the primary side and, the switching turn-off area $A_{OFF}$ may be considered as a secondary side current capacity, and a secondary side average current may be obtained by dividing the area of this portion by T and averaging the same.

If Equation 1 is arranged, an equation for the secondary side current may be obtained as shown in Equation 2 below.

$$\frac{A_{OFF}}{T} = \frac{A_{ON}}{T} \times \frac{D_2}{D_1} \times \frac{1}{n} \qquad \text{Equation 2}$$

Here, $A_{OFF}/T$ represents a secondary side average current. $A_{ON}/T$ represents a primary side average current. $D_2/D_1 \times 1/n$ represents a ratio of the switching turn-off area $A_{OFF}$ and the switching turn-on area $A_{ON}$, and $1/n$ represents a turns ratio of the transforming unit 130.

According to Equation 2, the secondary side current capacity indicated by the switching turn-off area $A_{OFF}$ is eventually determined by the ratio of $D_1$ and $D_2$, i.e. the ratio of the switching turn-on period and switching turn-off period.

The primary side peak current flowing at the inductor $L_M$ may be expressed by Equation 3 below.

$$I_{PEAK} = \frac{V_{L.ON}}{L_M} D_1 T = \frac{V_{L.OFF}}{L_M} D_2 T \qquad \text{Equation 3}$$

Here, $I_{PEAK}$ represents a primary side peak current to be obtained, $V_{L.ON}$ represents voltage applied to both ends of the inductor $L_M$ when the switching element Q1 turns on, and $V_{L.OFF}$ represents voltage applied to both ends of the inductor $L_M$ when the switching element Q1 turns off, and $L_M$ represents inductance. $D_1T$ represents a switching turn-on period, and $D_2T$ represents a switching turn-off period.

In Equation 3, $D_2/D_1$ may be derived as shown in Equation 4 below.

$$\frac{D_2}{D_1} = \frac{V_{L.ON}}{V_{L.OFF}} = \frac{V_{IN}}{V_{DS} - V_{IN}} \qquad \text{Equation 4}$$

Here, $V_{IN}$ represents an input voltage applied to one end of the inductor $L_M$ through the rectifying unit 120 and the capacitor $C_{IN}$, $V_{DS}$ represents a drain voltage of the switching element Q1 applied to the other end of the inductor $L_M$, and $V_{DS}-V_{IN}$ represents a difference value between two voltages.

In the circuit of FIG. 2, $V_{L.ON}$ is identical to the input voltage $V_{IN}$. In addition, since the turns ratio is assumed as being 1:n, $V_{L.OFF}$ is $$V_{OUT} + V_{F.D1} \times \frac{1}{n}.$$

Here, $V_{OUT}$ represents an output voltage, $V_{F.D1}$ represents voltage applied to both ends of the diode D1, and $1/n$ represents a turns ratio.

If the value of $D_2/D_1$ shown in Equation 4 is applied to Equation 2, Equation 5 below may be obtained.

$$I'_S = \frac{A_{ON}}{T} \times \frac{V_{IN}}{V_{DS} - V_{IN}} \times \frac{1}{n} \qquad \text{Equation 5}$$

Here, $I'_S$ represents a secondary side current. In more detail, $I'_S$ represents a secondary side average current obtained by dividing a secondary side current capacity corresponding to the switching turn-off area $A_{OFF}$ by a unit time T.

In Equation 5, all variables determining the secondary side current are included in the primary side. Since the turns ratio 1/n is a fixed value, the secondary side current may be adjusted by three variables such as the drain voltage $V_{DS}$, the input voltage $V_{IN}$, and the primary side average current $A_{ON}/T$.

In the present disclosure, a circuit for controlling the secondary side average current by using Equation 5 is configured. Here, an average current is obtained first by averaging peak currents in order to control the average current, and then the output of the second side is adjusted by using the obtained average current, thereby obtaining a constant-current output at the LED unit.

Therefore, in the present disclosure, it is not needed to detect the secondary side current as feedback information by using an auxiliary coil of the primary side transformer, and more precise and stable constant-current control may be implemented by using a configuration of controlling an average current, instead of a peak current.

The light driving apparatus of FIG. 2 implements a circuit according to the above principle as an embodiment. Operations and roles of detailed components of the light driving apparatus according to an embodiment will be described below in detail with reference to FIG. 2.

The light driving apparatus of FIG. 2 is classified into a primary side and a secondary side, based on the transforming unit 130. The primary side of the transforming unit 130 includes an AC power source 110, a rectifying unit 120, a switching element Q1, an operator unit 210 and a control unit 200. The secondary side of the transforming unit 130 is configured as a simplified circuit including a rectifying unit 310 and a LED unit 320.

The rectifying unit 120 of the input terminal is configured as a bridge diode including two output terminals and two input terminals, and receives AC power $V_{ac}$ output from the AC power source 110 and rectifies the AC power into DC. The capacitor $C_{IN}$ of the input terminal plays a role of a filter and smoothes the power rectified by the rectifying unit 120. One end of the capacitor $C_{IN}$ is connected to the ground, and the other end is connected to the output of the rectifying unit 120. If the AC power $V_{ac}$ applied from the AC power source 110 passes through the rectifying unit 120 and the capacitor $C_{IN}$ of the input terminal, the AC power becomes the undulating voltage mixed with ripples.

The transforming unit 130 includes a transformer TF for transforming the magnitude of the input voltage output through the capacitor $C_{IN}$ and outputting the input voltage to the secondary side, and an inductor $L_M$ connected to the primary side of the transformer TF in parallel. The transforming unit 130 stores energy in the inductor $L_M$ of the primary side when the switching element Q1 turns on and transfers the energy stored in the inductor $L_M$ to the secondary side when the switching element Q1 turns off.

The transformer TF of the transforming unit 130 has a turns ratio of 1:n, and outputs the undulating voltage mixed with ripples, generated through the capacitor $L_M$ of the input terminal to the secondary side after raising or dropping the voltage according to the turns ratio of the primary side and the secondary side. Generally, in case of LED applications, the voltage is dropped.

The rectifying unit 310 of the output terminal coupled to the secondary side of the transforming unit 130 rectifies the secondary side output of the transforming unit 130 and supplies the output voltage to the LED unit 320. The voltage transferred from the primary side of the transforming unit 130 to the secondary side is rectified and smoothed through the diode D1 and the capacitor $C_{OUT}$ of the output terminal rectifying unit 310 and supplied to the LED unit 320 in the form of DC power $V_{OUT}$.

LED elements of the LED unit 320 may give light according to the DC power $V_O$ from the output terminal capacitor $C_{OUT}$. In one embodiment, the LED unit 320 includes a plurality of LED elements connected in series as shown in FIG. 2. According to an embodiment, several sets of LED elements configured integrated in series as described above may be connected in parallel.

The switching element Q1 is controlled to turn on or off according to the control signal output from the switching control unit 220. If the switching element Q1 turns on, energy is stored in the primary side inductor $L_M$, and if the switching element Q1 turns off, the energy stored in the inductor $L_M$ is transferred to the secondary side through the transformer TF.

In one embodiment, the switching element Q1 may be a Metal Oxide Semiconductor Field Effect Transistor (MOSFET) having gate, source and drain terminals. The switching element Q1 may be a N-type MOSFET as shown in FIG. 2, which may be replaced with a P-type MOSFET while changing the circuit partially.

The gate terminal of the switching element Q1 is connected to the output terminal of the comparator 222 included in the switching control unit 220 to receive a control signal, the source terminal is connected to one end of the sensing resistor 215, and the drain terminal is connected to the primary side of the transforming unit 130, respectively.

One end of the inductor $L_M$ included in the transforming unit 130 is connected to the output of the rectifying unit 120 and the capacitor $C_{IN}$ of the input terminal, and the other end is connected to the drain terminal of the switching element Q1.

The transforming unit 130 described above stores energy in the primary side inductor $L_M$ as much as defined in Equation 6 when the switching element Q1 turns on, and transfers the stored energy to the secondary side as much as proportional to the turns ratio if the switching element Q1 turns off.

$$L_M \times \frac{I_L^2}{2} \qquad \text{Equation 6}$$

Here, $L_M$ represents inductance, and $I_L$ represents current flowing at the inductor $L_M$.

The control unit 200 includes an operator unit 210 and a switching control unit 220, and the control unit 200 is provided at the primary side to play a role of controlling the secondary side current to be maintained consistently.

For this, the control unit 200 calculates a secondary side average current based on the current and voltage of the primary side, obtained from the inductor $L_M$ included in the primary side of the transforming unit 130, and controls the switching element to turn on or off according to the calculation result so that a constant driving current flows at the LED unit 320.

In detail, the control unit 200 obtains values corresponding to three variables such as the input voltage $V_{IN}$ applied to one end of the inductor $L_M$, the drain voltage $V_{DS}$ applied to the other end of the inductor $L_M$, and the primary side average current $A_{ON}/T$ during the switching turn-on period according to Equation 5 above, calculates a secondary side average current accordingly, and controls the switching element Q1 to turn on or off according to the calculation result.

The operator unit 210 includes samplers 211, 213, a subtractor 212, a divider 214, a sensing resistor 215, a RC filter 216, and a multiplier 217.

According to Equation 5, the operator unit 210 should sample the input voltage $V_{IN}$ and the drain voltage $V_{DS}$ applied to both ends of the inductor $L_M$ in order to obtain a value of $$\frac{V_{IN}}{V_{DS} - V_{IN}},$$

and perform a subtracting operation to two sampled voltages to obtain a difference value between the voltages at both ends of the inductor $L_M$.

Therefore, in one embodiment, a circuit is configured to include two samplers 211, 213 and the subtractor 212 as shown in FIG. 2 so that one sampler 211 simples the input voltage $V_{IN}$ and the other sampler 213 performs sampling by a subtracting operation between the input voltage $V_{IN}$ and the drain voltage $V_{DS}$.

The first and second samplers 211, 213 are used to perform a sampling and holding function with respect an input signal, and have the input voltage sampled for a predetermined time in order to maintain a constant output.

In detail, the first sampler 211 samples the rectified input voltage $V_{IN}$, synchronized with a pulse signal generated by the pulse generator 223 and applied to one end of the inductor $L_M$ at a rising edge.

The subtractor 212 receives the rectified input voltage $V_{IN}$ at one end of the inductor $L_M$ in the input terminal and the drain voltage $V_{DS}$ of the switching element Q1 applied to the other end of the inductor $L_M$, and performs a subtracting operation to subtract the rectified input voltage $V_{IN}$ from the drain voltage $V_{DS}$.

The second sampler 213 receives the difference value $V_{DS}-V_{IN}$ obtained by subtracting the rectified input voltage $V_{IN}$ from the drain voltage $V_{DS}$ of the switching element Q1 through the subtractor 212 and samples the difference value.

As described above, the $V_{DS}-V_{IN}$ operation is performed through the first sampler 211, the second sampler 213 and the subtractor 212.

Since the drain voltage $V_{DS}$ instantly raises just after the switching element Q1 turns off, the drain voltage $V_{DS}$ may be synchronized with a signal through the delay timer 218 and then sampled. In one embodiment, the delay timer 218 generates a delay signal and outputs the delay signal to the second sampler 213, so that the second sampler 213 may be synchronized with the delay signal and sample the difference value $V_{DS}-V_{IN}$ between the voltages at both ends of the inductor $L_M$.

The divider 214 performs a dividing operation between two sampled voltages $V_{IN}$, $V_{DS}-V_{IN}$. In other words, the divider 214 divides the input voltage $V_{IN}$ sampled at the first sampler 211 by the difference value $V_{DS}-V_{IN}$ sampled at the second sampler 213. Accordingly, the value $$\frac{V_{IN}}{V_{DS} - V_{IN}}$$

is obtained.

The sensing resistor 215 and the RC filter 216 are circuits for obtaining a primary side average current during the switching turn-on period.

The sensing resistor 215 is a resistor for detecting a peak current of the switching turn-on period and is coupled between the switching element Q1 and the ground. The sensing resistor 215 described above converts a linearly increasing current into voltage when the switching element Q1 turns on and detects a positive ramp voltage by means of the current flowing in the period when the switching element Q1 turns on.

In Equation 5, $$\frac{A_{ON}}{T}$$

represents a primary side average current and is implemented by the RC filter 216. The RC filter 216 averages the output of the sensing resistor 215 to obtain the primary side average current. In detail, the RC filter 216 averages the positive ramp voltage detected by the sensing resistor 215 to convert the positive ramp voltage into an average voltage and outputs the average current, so that the entire system may operate in an average current mode.

The multiplier 217 multiplies the primary side average current obtained at the RC filter 216 by the output of the divider 214. The output of the divider 214 is $$\frac{V_{IN}}{V_{DS} - V_{IN}},$$

which may be multiplied by the turns ratio 1/n of the transforming unit 130 at the multiplier 217. Accordingly, the result of Equation 5 above is obtained.

As described above, the operator unit 210 obtains the primary side average current of the switching turn-on period from the primary side of the transforming unit 130, receives the voltages at both ends of the inductor $L_M$, and calculates a secondary side average current based on the obtained primary side average current, the voltages at both ends of the inductor $L_M$, and the turns ratio of the transforming unit 130.

The switching control unit 220 controls the switching element Q1 to turn on or off according to the calculation result of the operator unit 210.

In detail, the switching control unit 220 converts the secondary side average current output from the operator unit 210 into voltage, compares the voltage with the target voltage $V_{ctr}$, and determines whether the control signal output to the switching element Q1 has a logic value of low or high according to the comparison result, thereby controlling the switching element Q1 to turn on or off.

For this, the switching control unit 220 includes a compensator 221, a comparator 222, and a pulse generator 223.

The compensator 221 is a circuit for preventing malfunction to ensure stability of the entire system having a feedback loop and outputs an error between an actual average voltage obtained from the output of the multiplier 217 and a desired target voltage $V_{ctr}$.

In one embodiment, the secondary side average current output from the multiplier 217 is converted into an average voltage through the input terminal resistor R2 of the compensator 221 and applied to the input terminal of an error amplifier AMP. A target voltage $V_{ctr}$ is applied to the other input terminal of the error amplifier AMP. The error amplifier AMP of the compensator 221 receives the actual average voltage and the desired target voltage $V_{ctr}$, and then outputs an error between two voltages, after being amplified. The compensator 221 has an output obtained by multiplying the difference value between two voltages by a gain as much as $$\frac{R3}{R2}.$$

The comparator 222 compares the output voltage of the compensator 221 with the triangular pulse voltage output from the pulse generator 223 and outputs a control signal, thereby allowing the switching element Q1 to turn on or off. The value of the control signal is low or high.

The pulse generator 223 generates a pulse signal for synchronization control and inputs the pulse signal to the first sampler 211, and generates a triangular pulse voltage serving as a reference for error detection and inputs the triangular pulse voltage to the comparator 222.

Figure 4:
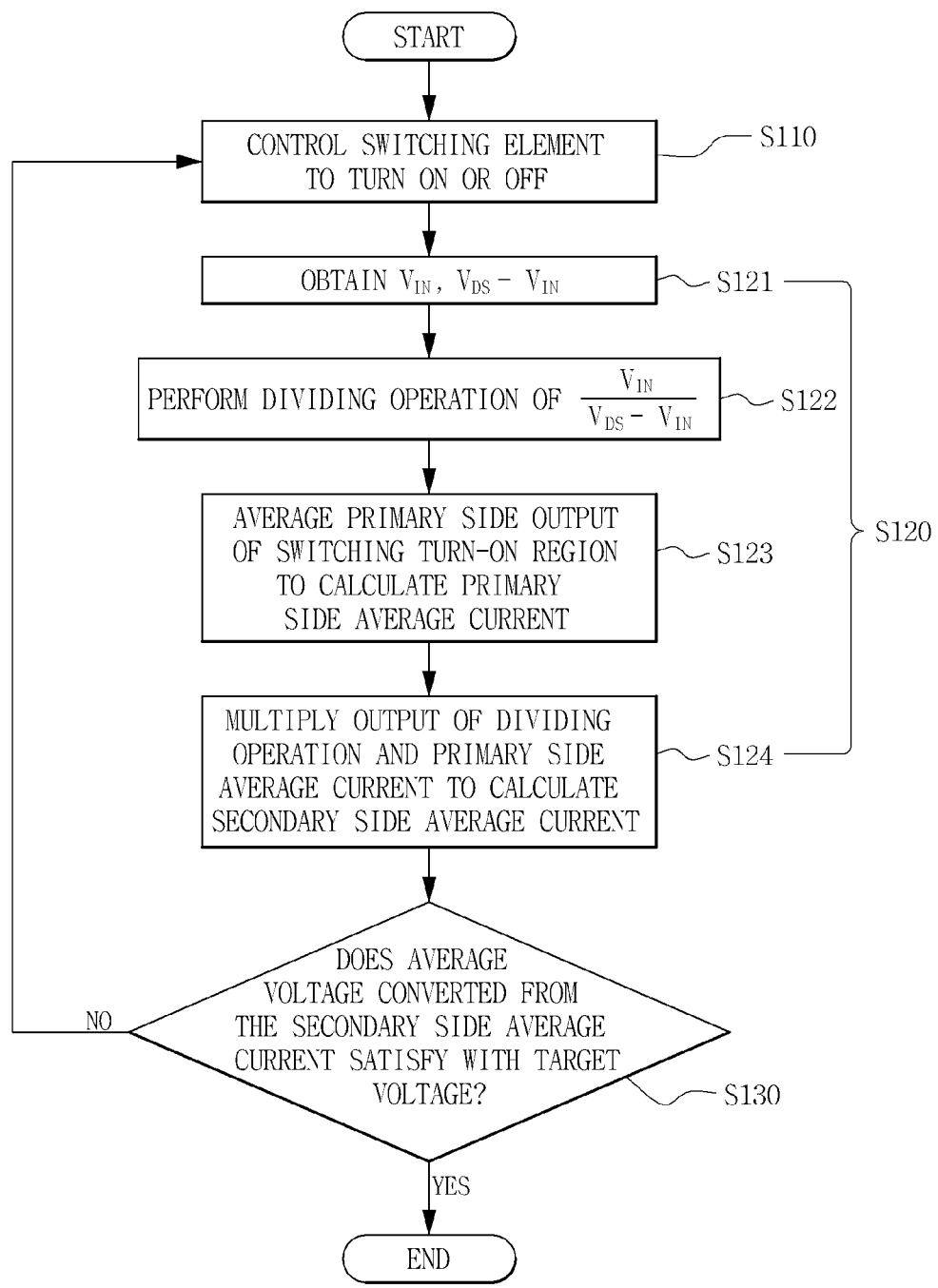
FIG. 4 is a flowchart for illustrating a light driving method according to an embodiment of the present disclosure.

FIG. 4 is a flowchart for illustrating a light driving method according to an embodiment of the present disclosure.

The switching control unit 220 repeats the operations of driving the transforming unit 130 by controlling the switching element Q1 to turn on or off, storing the energy in the inductor $L_M$ included in the primary side of the transforming unit 130, and transferring the energy to the secondary side of the transforming unit 130 (S110).

The operator unit 210 calculates a secondary side average current based on the primary side average current of the switching turn-on period obtained from the primary side of the transforming unit 130, the voltages at both ends of the inductor $L_M$, and the turns ratio of the transforming unit 130 (S120).

Operation S120 will be described below in more detail.

First, the operator unit 210 obtains the input voltage $V_{IN}$ applied to one end of the inductor $L_M$ during the switching turn-on period and the difference value between the voltages at both ends of the inductor $L_M$ by means of sampling (S121). The difference value between the voltages at both ends of the inductor $L_M$ is a value $V_{DS}-V_{IN}$ obtained by subtracting the input voltage $V_{IN}$ from the drain voltage $V_{DS}$ applied to the other end of the inductor $L_M$ (S121).

After that, the operator unit 210 obtains a value of $$\frac{V_{IN}}{V_{DS} - V_{IN}}$$

by dividing the sampled input voltage $V_{IN}$ by the sampled difference value $V_{DS}-V_{IN}$ (S122), and averages the primary side of the switching turn-on period to obtain a primary side average current during the switching turn-on period (S123).

After that, the operator unit 210 multiplies the average current obtained in Operation S123 by the output $$\frac{V_{IN}}{V_{DS} - V_{IN}}$$

obtained by the dividing operation in Operation S122 to obtain a secondary side average current, and outputs the secondary side average current to the switching control unit 220 (S124). At this time, the turns ratio 1/n of the transforming unit 130 is multiplied together.

After that, in Operation S130, the switching control unit 220 converts the secondary side average current calculated in Operation S124 into voltage, compares the converted average voltage with the target voltage $V_{ctr}$, and controls the switching element Q1 to turn on or off again according to the comparison result so that a constant current flow at the LED unit located in the secondary side of the transforming unit 130.

As a result of comparison in Operation S130, if the actual average voltage obtained in Operation S120 does not satisfy the target voltage $V_{ctr}$, the switching control unit 220 feeds back to Operation S110 to control the switching element Q1 to turn on or off again.

As a result of comparison in Operation S130, if the actual average voltage obtained in Operation S120 satisfies the target voltage $V_{ctr}$, it is determined that a constant current flows at the LED unit of the secondary side, and so the switching control process is completed without a feedback operation.

The switching control unit 220 may output an error between the actual average voltage and the desired target voltage $V_{ctr}$ through the compensator 221, compare the output voltage of the compensator 221 with the triangular pulse voltage serving as a reference for error detection, and control a turn-on or turn-off state of the switching element Q1 according to the comparison result.

For example, if a difference between both voltages is great, an error rate is high, and so the turn-on and turn-off state of the switching element Q1 may be changed so that the duty ratio of the switching element Q1 may be adjusted. If both voltages have no difference, the constant current is exactly implemented, and so the current duty ratio is maintained without changing the state of the switching element Q1.

If this principle is applied, the secondary side does not require circuit elements such as a control circuit, peripheral elements, and an opto coupler, and the current of the secondary side may be controlled at the primary side without the secondary side feedback information.

Figure 1:
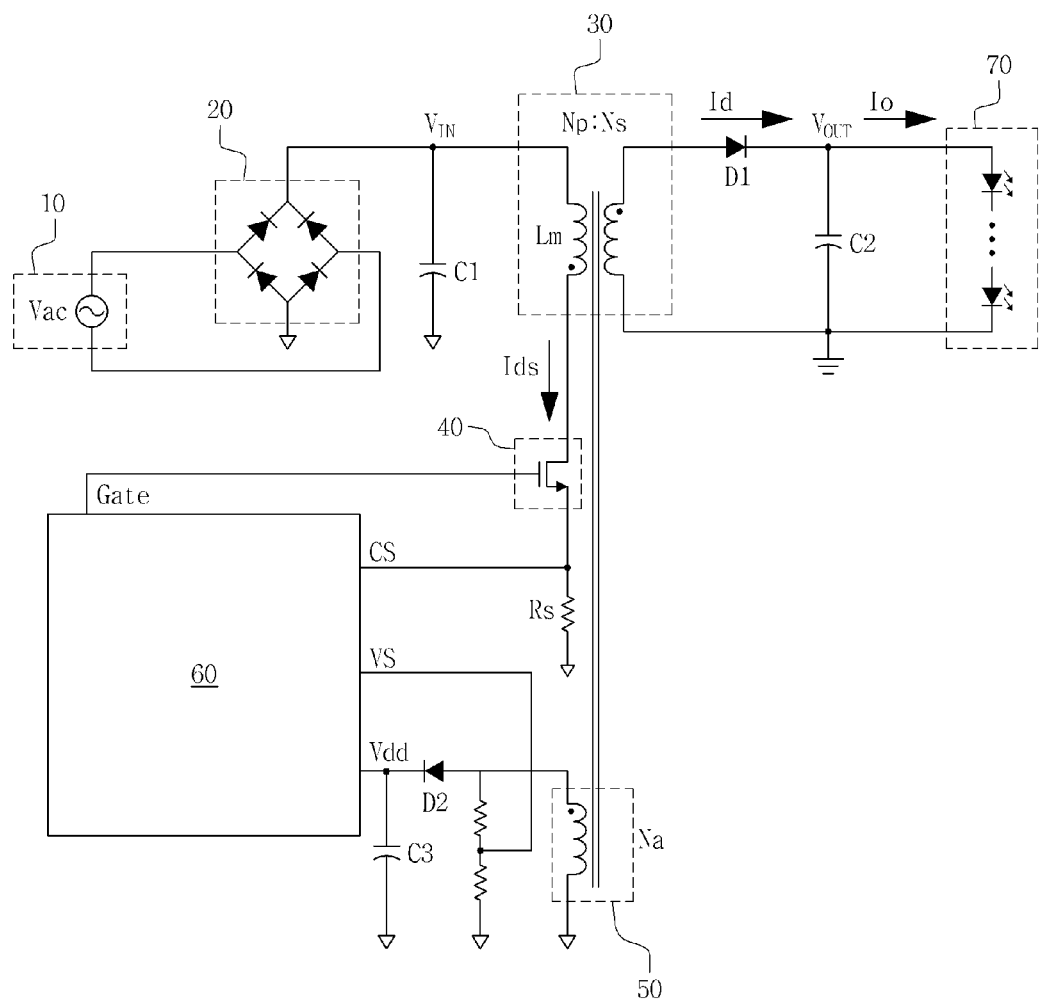
FIG. 1 is a diagram showing a conventional primary side regulation type light driving apparatus.

In addition, different from a conventional primary side regulation method using an auxiliary coil as shown in FIG. 1, the present disclosure does not use an auxiliary coil of the transformer. By doing so, it is possible to reduce the unit cost, prevent the efficiency loss caused by the use of an auxiliary coil, and allow exact control of the secondary side current.

The light driving apparatus and method according to the present disclosure are not limited to the above embodiments but may be modified in various within the scope of the present disclosure.

What is claimed is:

1. A light driving apparatus, comprising:
   a first rectifying unit for receiving AC power and rectifying the AC power into DC power;
   a switching element;
   a transforming unit having a transformer for transforming the magnitude of an input voltage output from the first rectifying unit and an inductor connected to a primary side of the transformer in parallel, the transforming unit storing energy in the inductor when the switching element turns on and transferring the energy stored in the inductor to a secondary side when the switching element turns off;
   a second rectifying unit for rectifying a secondary side output of the transforming unit and supplying the secondary side output of the transforming unit to a LED unit; and
   a control unit for calculating a secondary side average current based on current and voltage of the primary side, obtained from the inductor included in the primary side of the transforming unit, and controlling the switching element to turn on or off according to a result of the calculation so that a constant driving current flows at the LED unit,
   wherein the control unit samples an input voltage applied to one end of the inductor and a difference value between the voltages at both ends of the inductor, divides the sampled input voltage by the sampled difference value, obtains a primary side average current by averaging a primary side output of the switching turn-on period, and obtains a secondary side average current by multiplying the obtained primary side average current and the output of the dividing operation.

2. The light driving apparatus according to claim 1, wherein the control unit comprises:
   an operator unit for obtaining the primary side average current of a switching turn-on period from the primary side of the transforming unit, receiving voltages at both ends of the inductor, and calculating the secondary side average current based on the obtained primary side average current and the voltages at both ends of the inductor; and
   a switching control unit for converting the secondary side average current output from the operator unit into a voltage to be compared with a target voltage, determining a logic value of a control signal output to the switching element according to a result of the comparison, and controlling the switching element to turn on or off.

3. The light driving apparatus according to claim 2, wherein the operator unit comprises:
   a first sampler for sampling an input voltage applied to one end of the inductor;
   a subtractor for receiving the input voltage at one end of the inductor and a voltage applied to the other end of the inductor and performing a subtracting operation between both voltages;
   a second sampler for sampling a difference value output from the subtractor;
   a divider for dividing the input voltage sampled at the first sampler by the difference value sampled at the second sampler;
   a sensing resistor coupled between the switching element and a ground to detect a peak current of the switching turn-on period;
   a RC filter for averaging the output of the sensing resistor to obtain the primary side average current; and
   a multiplier for multiplying the primary side average current obtained by the RC filter and the output of the divider.

4. The light driving apparatus according to claim 3, wherein the operator unit further comprises a delay timer for outputting a delay signal, so that the second sampler performs sampling as being synchronized with the delay signal of the delay timer.

5. The light driving apparatus according to claim 3, wherein the switching control unit comprises:
   a compensator for outputting a difference between an average voltage obtained from the output of the multiplier and a target voltage; and
   a comparator for comparing the output of the compensator with a triangular pulse voltage which is a reference and outputting a control signal for controlling the switching element to turn on or off.

6. The light driving apparatus according to claim 5, wherein the switching control unit further comprises a pulse generator for generating a pulse signal for synchronization control, inputting the pulse signal to the first sampler, generating the triangular pulse voltage which is a reference for error detection, and inputting the triangular pulse voltage to the comparator.

7. The light driving apparatus according to claim 1, wherein the control unit calculates a secondary side average current I'$_S$ by using the equation below:

$$I'_S = \frac{A_{ON}}{T} \times \frac{V_{IN}}{V_{DS} - V_{IN}} \times \frac{1}{n}$$

where $A_{ON}$ represents a primary side current flowing at the inductor in a switching turn-on period, T represents a unit time, $A_{ON}/T$ represents a primary side average current of the switching turn-on period, $V_{IN}$ represents an input voltage applied to one end of the inductor, $V_{DS}$ represents voltage applied to the other end of the inductor, and 1/n represents a turns ratio.

8. A light driving method, comprising:

driving a transforming unit by controlling a switching element to turn on or off to store energy in an inductor included in a primary side of the transforming unit, and transferring the energy to a secondary side of the transforming unit;

calculating a secondary side average current based on the primary side average current of a switching turn-on period obtained from the primary side of the transforming unit and voltages at both ends of the inductor;

converting the calculated secondary side average current into voltage and comparing the voltage with a target voltage; and controlling the switching element to turn on or off again according to a result of the comparison so that a constant current flows at an LED unit located at the secondary side of the transforming unit, wherein the calculating of a secondary side average current comprises sampling an input voltage applied to one end of the inductor and a difference value between the voltages at both ends of the inductor, dividing the sampled input voltage by the sampled difference value, obtaining a primary side average current by averaging a primary side output of the switching turn-on period, and obtaining a secondary side average current by multiplying the obtained primary side average current and the output of the dividing operation.

\* \* \* \* \*